(12) United States Patent
Rutherford et al.

(10) Patent No.: US 7,509,849 B2
(45) Date of Patent: Mar. 31, 2009

(54) TIRE PRESSURE GAUGE WITH DATA TRANSMITTER

(76) Inventors: Robert B. Rutherford, 5 Shady Oaks Dr., Folsom, CA (US) 95630; Mike Levenson, 25 Yale Rd., Pembroke, MA (US) 02359

( * ) Notice: Subject to any disclaimer, the term of this patent is extended or adjusted under 35 U.S.C. 154(b) by 116 days.

(21) Appl. No.: 11/413,694

(22) Filed: Apr. 27, 2006

(65) Prior Publication Data

US 2007/0193348 A1  Aug. 23, 2007

Related U.S. Application Data

(60) Provisional application No. 60/675,533, filed on Apr. 27, 2005.

(51) Int. Cl.
*B60C 23/02* (2006.01)

(52) U.S. Cl. ........................ 73/146.5; 340/447

(58) Field of Classification Search .................. 73/146, 73/146.8, 146.5; 340/447, 445
See application file for complete search history.

(56) References Cited

U.S. PATENT DOCUMENTS

| | | |
|---|---|---|
| 3,789,867 A | 2/1974 | Yabor |
| 3,873,965 A | 3/1975 | Garcia |
| 3,969,936 A | 7/1976 | Lindsay |
| 3,990,309 A | 11/1976 | Beckwith |
| 4,051,803 A | 10/1977 | Arnone |
| 4,248,080 A | 2/1981 | Chuck |
| 4,270,568 A | 6/1981 | Gray |
| 4,279,161 A | 7/1981 | Huston |
| 4,606,391 A | 8/1986 | Achterholt |
| 4,619,137 A | 10/1986 | Bott |
| 4,723,445 A | 2/1988 | Ripley |
| 4,763,516 A | 8/1988 | Greenspan |
| 4,773,270 A | 9/1988 | Ogasawara |
| 4,924,697 A | 5/1990 | Hunt |
| 4,953,395 A | 9/1990 | Jard |
| 4,970,491 A | 11/1990 | Saint |
| 5,040,562 A | 8/1991 | Achterholt |
| 5,289,160 A * | 2/1994 | Fiorletta ..................... 340/447 |
| 5,357,242 A | 10/1994 | Morgano |
| 5,365,967 A | 11/1994 | Moore |
| 5,377,539 A | 1/1995 | LaSalle |
| 5,503,012 A | 4/1996 | Rabizadeh |
| 5,694,111 A | 12/1997 | Huang |
| 5,717,135 A * | 2/1998 | Fiorletta et al. ............ 73/146.5 |
| 5,965,822 A | 10/1999 | Wu |
| 6,085,595 A | 7/2000 | Ferguson |
| 6,119,525 A | 9/2000 | Hamma |

(Continued)

*Primary Examiner*—Andre J Allen
(74) *Attorney, Agent, or Firm*—Heisler & Associates

(57) ABSTRACT

A tire pressure gauge is provided mountable to a valve stem of a tire/wheel combination or to a rim of a wheel. The tire pressure gauge includes both a proximal display viewable by an individual adjacent the tire/wheel combination and a remote indicator of tire pressure status. This remote indicator can be in the form of a warning light or in the form of a remote display with a receiver/antenna communicating with a transmitter coupled to a pressure transducer which monitors tire pressure. Most preferably, both the warning light and remote display are provided together. A valve core is associated with the tire pressure sensor for ease in adding air to the tire when needed. The pressure transducer and warning light and/or transmitter are contained together within a transmission module preferably removably coupleable to a gauge including the tire pressure sensor and the proximal display.

25 Claims, 6 Drawing Sheets

U.S. PATENT DOCUMENTS

| | | | |
|---|---|---|---|
| 6,252,498 B1 * | 6/2001 | Pashayan, Jr. | 340/447 |
| 6,843,115 B2 | 1/2005 | Rutherford | |
| 7,040,152 B2 | 5/2006 | Rutherford | |
| 2004/0025581 A1 * | 2/2004 | Miller | 73/146 |

* cited by examiner

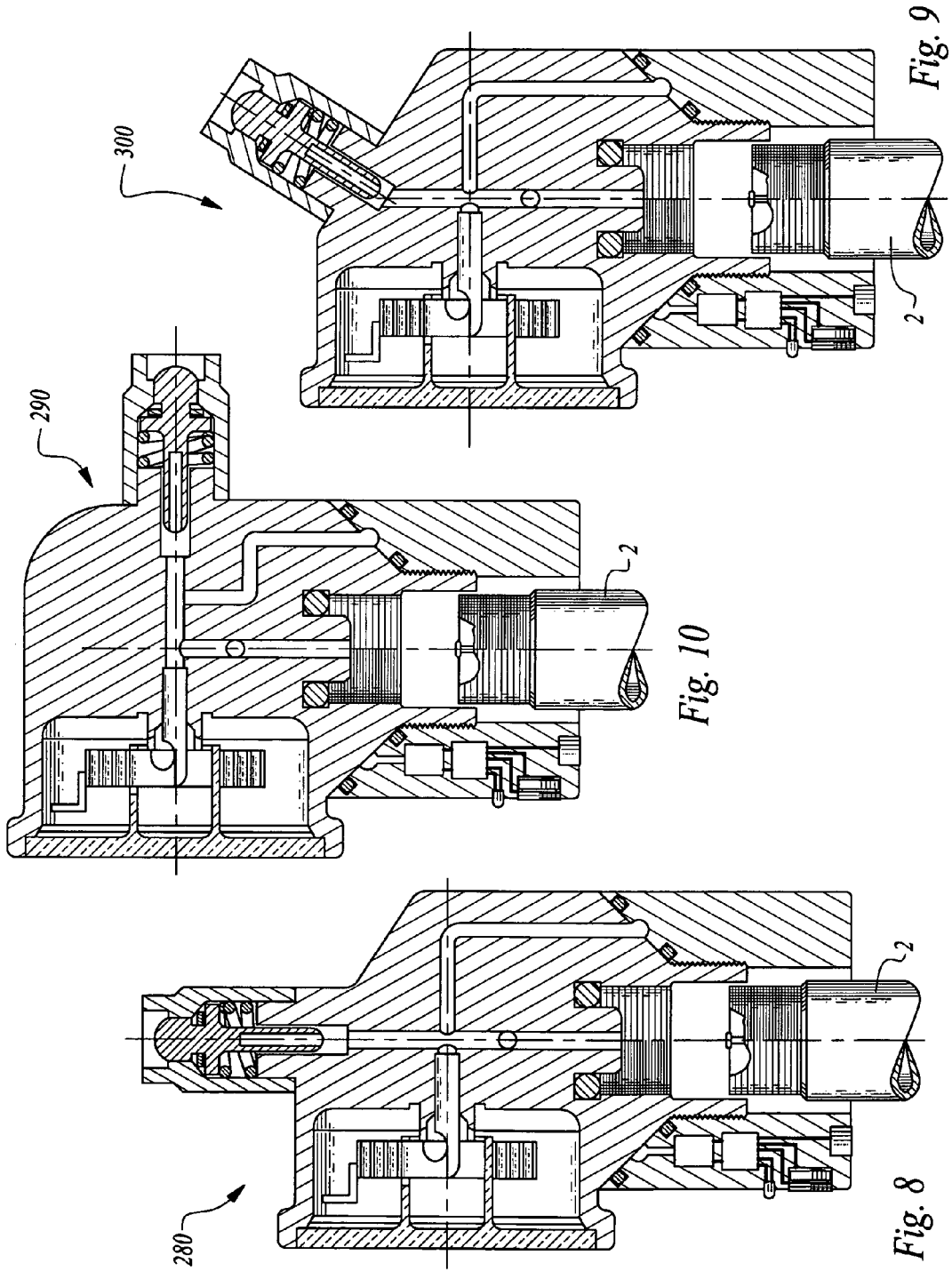

TIRE PRESSURE GAUGE WITH DATA TRANSMITTER

CROSS-REFERENCE TO RELATED APPLICATIONS

This application claims benefit under Title 35, United States Code §119(e) of U.S. Provisional Application No. 60/675,533 filed Apr. 27, 2005.

FIELD OF THE INVENTION

The following invention relates to tire pressure gauges and particularly tire pressure gauges which can remain mounted upon the tire/wheel assembly during operation of the wheel and which also includes a transmitter for remote signaling of information relating to pressure within the tire.

BACKGROUND OF THE INVENTION

One important criteria for safely operating a motor vehicle is the maintenance of proper pressure within tires of the vehicle. If tire pressure is not maintained, fuel economy is adversely affected and rates of tire wear increase. Additionally, handling of the vehicle can be adversely affected and the potential for abrupt failure of the tire is increased. Hence, it is advisable to monitor the pressure within vehicle tires on a regular basis.

One of the difficulties encountered in such regular tire pressure monitoring is that a significant amount of time is associated with monitoring tire pressure. In particular, a safety cap must be removed from the valve stem (and not misplaced). The gauge must be placed upon the valve stem of the tire. Care must be taken to make sure that a significant amount of air is not lost from the tire during this gauge installation process. The pressure can then be read from the gauge. If the tire pressure is adequate, the procedure is completed for that tire and the next tire can be checked. On a vehicle with multiple tires, this basic routine can be significantly time consuming, decreasing the likelihood that tire pressure monitoring will occur on a sufficiently frequent basis.

Compounding this difficulty is the inconvenience encountered when tire pressure is low and air needs to be added to the tire. First the gauge is removed. Then the vehicle is brought into proximity with a source of compressed air. Then compressed air is added to the tire. Unless an accurate gauge is associated with the source of compressed air, the source of compressed air must be removed after a relatively short period of time and the pressure gauge reinserted on the valve stem to take another reading. Typically, a half a dozen or so filling steps and measuring steps are involved before the tire pressure has been brought to the proper level.

It is known in the prior art to provide tire pressure gauges which are mountable upon a valve stem and which are sufficiently small and lightweight that they can remain mounted to the tire during operation of the tire. While this solves a portion of the problem, the difficulty associated with adding air to the tire is not alleviated. In at least two prior art patents, tire pressure gauges are taught which further allow for a source of compressed air to pass into the valve stem of the tire while the gauge remains upon the valve stem. In particular, U.S. Pat. No. 5,377,539 to LaSalle and U.S. Pat. No. 4,924,697 to Hunt (each incorporated herein by reference in their entirety) disclose tire pressure gauges which can mount on a valve stem of a tire and which also include a port through which compressed air can be added without removing the tire pressure gauge.

The tire pressure gauges taught by LaSalle and Hunt are not entirely satisfactory. In particular, in the case of LaSalle the fill port passes through a center of a face which is read to determine the pressure of the tire. A Bourdon tube supporting an indicator is wrapped around this fill tube. To accommodate this fill port passing through a center of the Bourdon tube, a customized Bourdon tube is required which significantly complicates the manufacture of the gauge taught by LaSalle. Also, reading the pressure indicated by the Bourdon tube is made more difficult by the presence of a valve core in a middle of a face of the gauge.

Another problem associated with most prior art tire pressure gauges is that they require viewing by a user when the vehicle is stopped. Often a low pressure condition (or an excessively high pressure condition) occurs while the vehicle is in motion. By the time the driver feels that the vehicle is not operating properly due to inappropriate tire pressure, often damage has already been done to the tire or wheel, or the driver has already consumed excessive fuel or has placed the vehicle in an unsafe condition should emergency handling be necessitated.

Prior art systems are known which include pressure transducers mounted to tire/wheel assemblies and which transmit this pressure signal to a receiver coupled to a display which the vehicle operator can view while the vehicle is in operation to monitor tire pressure status. For instance, U.S. Pat. No. 5,694,111 to Huang and U.S. Pat. No. 4,970,491 to Saint each teach systems which can sense pressure and allow a driver of a vehicle to monitor this pressure remotely. However, such systems are deficient in numerous respects.

In particular, such systems provide a high degree of complexity (thus increasing cost) and are not simple and intuitive for an operator to use. These systems include multiple channels for the multiple wheels of the vehicle and involve transmission of a large amount of information, such as pressure data for multiple wheels. When a reading is provided on the display which indicates that a tire requires air pressure adjustment, an operator must have a high degree of familiarity with the system to be able to find the appropriate tire, especially on large commercial trucks which can often have eighteen or more wheels. Once the wheel having the improper air pressure is found, the user is still faced with a relatively tedious process of utilizing some additional tire pressure gauge and source of compressed air to alternately adjust the air pressure, take a new tire pressure reading, and continue iteratively until the desired tire pressure is achieved.

Accordingly, a need exists for a tire pressure gauge which has a signal transmission capability but which maintains simplicity and can be easily used to determine which wheel has improper air pressure and which readily facilitates air pressure adjustment.

SUMMARY OF THE INVENTION

With this invention, a tire pressure gauge is provided which includes at least two visible displays including a proximal display adjacent the tire which displays tire pressure and some form of secondary at least partially remote display at a minimum indicating whether tire pressure for the tire adjacent the gauge is proper or improper. The secondary display is driven by a pressure transducer in the form of an electrically powered device in fluid communication with air inside of the tire for driving of the pressure transducer, or the pressure transducer can be coupled to the proximal display to create an electronic signal from a pressuring reading of the proximal display itself.

This pressure transducer creates a pressure signal which correlates with a pressure within an interior of the tire. In one form, this pressure signal could merely be analyzed by a processor or simple circuit to cause a warning light to be illuminated if the pressure signal indicates that the pressure within the tire is improper (i.e. too high or too low), and leaves the warning light non-illuminated when the pressure within the tire is proper. Such a warning light can be viewed from a distance away from the tire, such that this remote display away from the tire is provided.

Alternatively, and preferably in addition to the warning light, the pressure transducer additionally communicates the pressure signal to a signal transmitter which is adapted to transmit an electromagnetic signal related to the pressure signal. This electromagnetic signal can then be received by a signal receiver at a location remote from the transmitter. Most typically, the transmitter would be mounted to the tire/wheel assembly so that it is rotating when the vehicle is in motion. The signal receiver would be mounted somewhere upon the vehicle and receive this signal. The signal receiver would then be coupled to a remote display which could merely be in the form of a warning light which is illuminated when the electromagnetic signal interpreted to indicate improper tire pressure. In a more complex variation, the pressure signal could be proportional to tire pressure or otherwise encoded with tire pressure information so that the electromagnetic signal contains an actual tire pressure measurement data set therein which can be interpreted by the remote display so that the remote display can present to an operator, such as a vehicle driver, precisely what pressure is existing within the tire.

Typically, a vehicle would include multiple tire pressure gauges, one for each tire/wheel combination and these separate gauges would all communicate with a single signal receiver or multiple signal receivers coupled to a single remote display. The remote display would preferably be configured so that it can distinguish between the information provided by each of the pressure transducers. However, in a simplest system, the remote display could be simply in the form of a single warning light indicating that at least one of the pressure transducers is reading a pressure which is improper. The operator can then stop the vehicle and very quickly determine which tire/wheel combination has an improper pressure by looking for the warning lights provided upon the gauge itself, mounted upon each of the tire/wheel combinations.

Furthermore, the operator can then approach the tire/wheel combination which has the illuminated warning light and immediately view the actual pressure within the tire by reading the proximal display. This proximal display is preferably in the form of a Bourdon tube and is merely an analog mechanical gauge. Alternatively, the proximal display could be some other form of tire pressure sensor including an analog electronic tire pressure sensor or a digital electronic tire pressure sensor and could conceivably be driven by the pressure transducer itself or coupled to the pressure transducer so that the tire pressure sensor drives both the proximal display and the pressure transducer. The operator can quickly determine how much air needs to be added to the tire. Furthermore, the gauge preferably includes a valve core thereon which allows fill air to be filled through the gauge for providing air into the tire without requiring removal of the gauge. Thus, a single step is involved in hooking up the fill air to the valve core and filling the tire until the gauge indicates a proper pressure.

While all of the various portions of the gauge could be provided in a single housing, most preferably the tire pressure sensor and proximal display are provided in a first common housing and the pressure transducer and signal transmitter are provided within a transmission module removably attachable to the common housing. With such an arrangement, the tire pressure sensor and proximal display could be utilized without the transmission module if desired. Alternatively, the tire pressure sensor, proximal display, pressure transducer and signal transmitter could all be contained within the common housing. The tire pressure sensor is preferably configured so that it mounts directly to a valve stem of the tire/wheel combination for convenient mounting to the tire.

Alternatively, a hole can be formed in a rim of the wheel and the gauge appropriately modified so that the common housing of the gauge can be mounted through this hole and directly to the rim. In such a configuration, the valve stem remains available for adding air into the tire. Thus, the inclusion of the valve core with the tire pressure gauge is not strictly required. Such a rim mounted tire pressure gauge could include a modified transmission module adapted to be interposed between the common housing and the rim, or the common housing can include the pressure transducer and signal transmitter therein in a single common housing.

The pressure transducer and signal transmitter are preferably two parts of an electronic circuit. This electronic circuit preferably includes a power source, such as a replaceable battery. A microprocessor is also preferably included which could be in the form of any microprocessor which can drive an electromagnetic signal transmitter and communicate with a device such as a pressure transducer. The microprocessor also preferably can drive the warning light with the pressure transducer, microprocessor, signal transmitter, warning light and battery all mounted within a common transmission module for removable attachment to a common housing including the tire pressure sensor and the proximal display, or with all of the electronic components included within the common housing along with the tire pressure sensor and proximal display.

OBJECTS OF THE INVENTION

Accordingly, a primary object of the present invention is to provide a tire pressure gauge which can be monitored remotely for tire pressure status information and monitored proximally by an individual adjacent the tire being monitored.

Another object of the present invention is to provide a tire pressure monitoring system which includes a tire pressure sensor mounted to the tire/wheel combination and a separate display coupled through a wireless interface to the tire pressure sensor for remote monitoring of tire pressure information.

Another object of the present invention is to provide a tire pressure sensor which readily communicates to an operator which wheel has a low pressure condition while the operator is still at a distance from the wheels.

Another object of the present invention is to provide a tire pressure monitoring system which gives the operator precise tire pressure information while the operator is adjacent the tire and preparing to adjust pressure within the tire.

Another object of the present invention is to provide a tire pressure monitoring system which includes gauges that can be mounted either to a valve stem of a tire/wheel combination or to a rim of the wheel.

Another object of the present invention is to improve safety and performance characteristics of a vehicle by allowing an operator to regularly monitor vehicle tire pressure.

Another object of the present invention is to provide a tire pressure sensor which can either be used without a pressure data transmission system or with a pressure data transmission system.

Other further objects of the present invention will become apparent from a careful reading of the included drawing figures, the claims and detailed description of the invention.

BRIEF DESCRIPTION OF THE DRAWINGS

FIGS. 8-12 are full sectional views of various alternative embodiments of that which is shown in FIG. 1 revealing how a valve core thereof can have a variety of different configurations and orientations relative to other portions of the gauge.

DESCRIPTION OF THE PREFERRED EMBODIMENT

Figure 1:
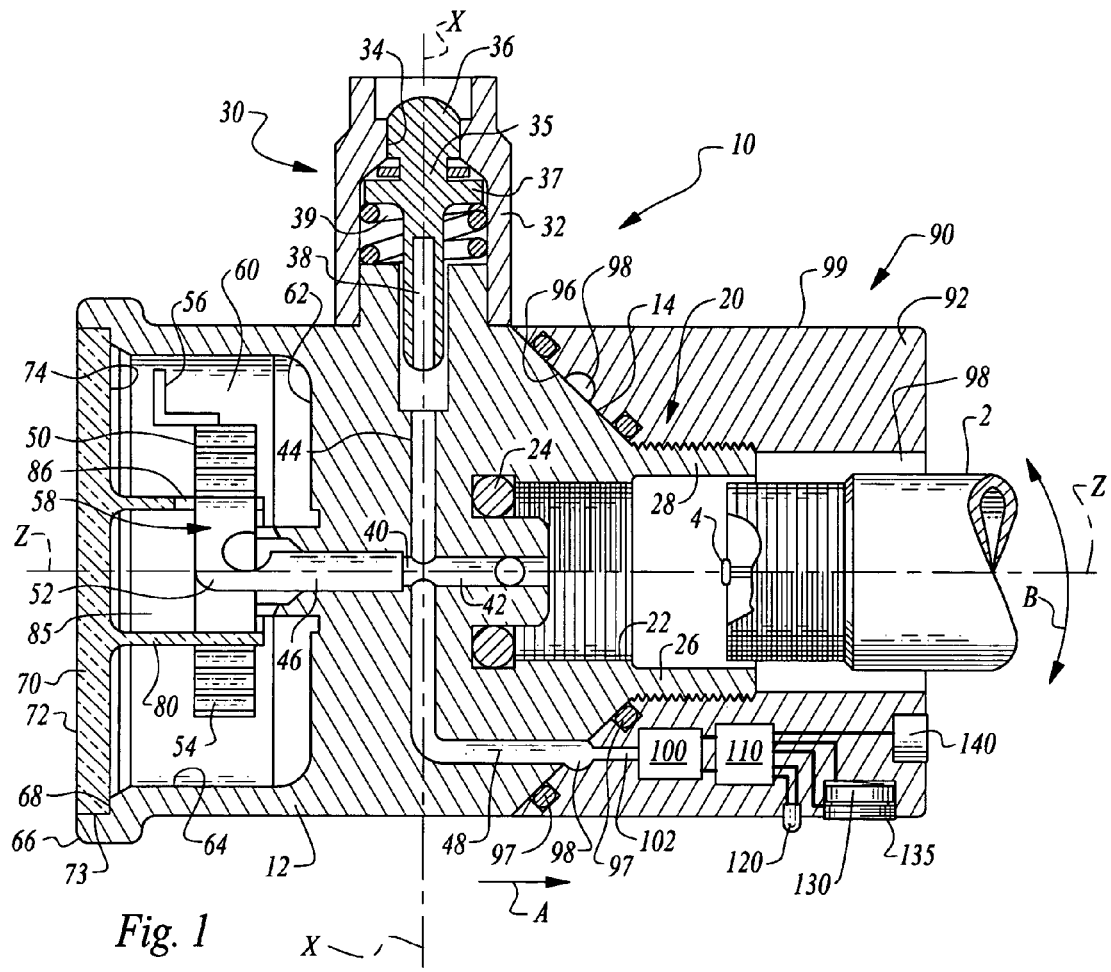
FIG. 1 is a full sectional view of the gauge of this invention along with a transmission module according to this invention with the gauge ready to be mounted to a valve stem of a tire/wheel combination.

Referring to the drawings, wherein like reference numerals represent like parts throughout the various drawing figures, reference numeral 10 is directed to a gauge (FIG. 1) for use in monitoring tire pressure. The gauge 10 is particularly configured to be coupled to a transmission module 90 which can interface with the gauge 10 and transmit a signal to a remote location where a remote display, such as the display 180 (FIG. 5), can display information relating to tire pressure within a tire to which the gauge 10 is mounted.

In essence, and with particular reference to FIG. 1, basic details of the gauge 10 and transmission module 90 are described, according to a preferred embodiment. In this preferred embodiment, the gauge 10 and transmission module 90 are provided within separate housings but are particularly configured so that they are readily attachable to each other, preferably in a removable fashion. Alternatively, the gauge 10 and transmission module 90 could be integrally formed together within a single common housing, or formed in separate housings which are permanently joined together.

The gauge 10 preferably includes a receiver 20 portion which is particularly configured to be mounted to a valve stem 2 of a tire/wheel combination. A valve core 30 is preferably provided which is in fluid communication with air entering the gauge 10 through the receiver 20. The valve core 30 can thus provide an access port for addition (or removal) of air from the tire when the gauge 10 is mounted upon the valve stem 2. A junction 40 defines a location where air from the receiver 20 is placed into communication with both the valve core 30 and a Bourdon tube 50 which acts as a preferred form of tire pressure sensor and proximal display of tire pressure information according to a preferred form of this invention.

The Bourdon tube 50 is located within a sensor chamber 60 which is preferably sealed and covered by a lens 70 through which the Bourdon tube 50 can be viewed. A shroud 80 is also preferably provided which can support the Bourdon tube 50 and keep the Bourdon tube 50 from losing proper calibration, especially when the wheel is rotating rapidly.

The transmission module 90 is preferably a separate structure which is generally of annular form and adapted to be threadably mounted to the gauge 10. The transmission module 90 preferably resides around the valve stem 2 with the transmission module 90 interposed between the gauge 10 and the tire/wheel combination. The transmission module 90 includes a pressure transducer 100 therein which is preferably in fluid communication with the air from within the tire, such as through the junction 40 and receiver 20.

A first processor 110 is preferably provided which powers the pressure transducer 100 and receives a tire pressure signal from the pressure transducer 100. A warning light 120 is also preferably coupled to the first processor 110 which can illuminate when an improper pressure is sensed by the pressure transducer 100. A battery 130 is preferably provided to power the first processor 110, pressure transducer 100 and light 120.

A transmitter 140 is also coupled to the first processor 110. The transmitter 140 is configured to emit an electromagnetic signal. This electromagnetic signal would most typically be a radio frequency ("RF") signal of a power and frequency suitable for small electronic devices. The electromagnetic signal could alternatively be in the form of an RFID ("Radio Frequency IDentification") enabled signal which receives power from a remote location and merely transmits the pressure signal by modifying an electromagnetic signal transmitted from the remote location. In such a configuration, at least portions of the circuit including the transmitter 140 could operate without a power source wired thereto or with a lesser power source.

This electromagnetic signal can be received by an antenna receiver 150 at a remote location. Such an antenna receiver 150 (FIG. 5) is preferably coupled to a second processor 160 which is coupled to a power supply 170. The second processor 160 is also preferably coupled to a display 180 which can be located at the remote location for viewing by an operator, with the display 180 displaying information correlating with the status of pressure within at least one wheel and provided by the gauge 10 and transmission module 90.

A retransmitter 190 can also be provided at the remote location to encode and transmit further information about tire pressure status over other bandwidths, such as cellular telephone bandwidths or higher power radio frequency bands, or other available telecommunications systems (i.e. wireless transmission systems provided under the trademark BLUETOOTH by Bluetooth Sig, Inc. of Bellevue, Wash. and provided under the trademark WI-FI by Wi-Fi Alliance of Mountain View, Calif.). With such a retransmitter 190, vehicle fleet operators can monitor the tire pressure status of vehicles within a fleet, or an operator can remotely monitor tire pressure when the operator is not at the vehicle, but rather from a remote location.

Figure 6:
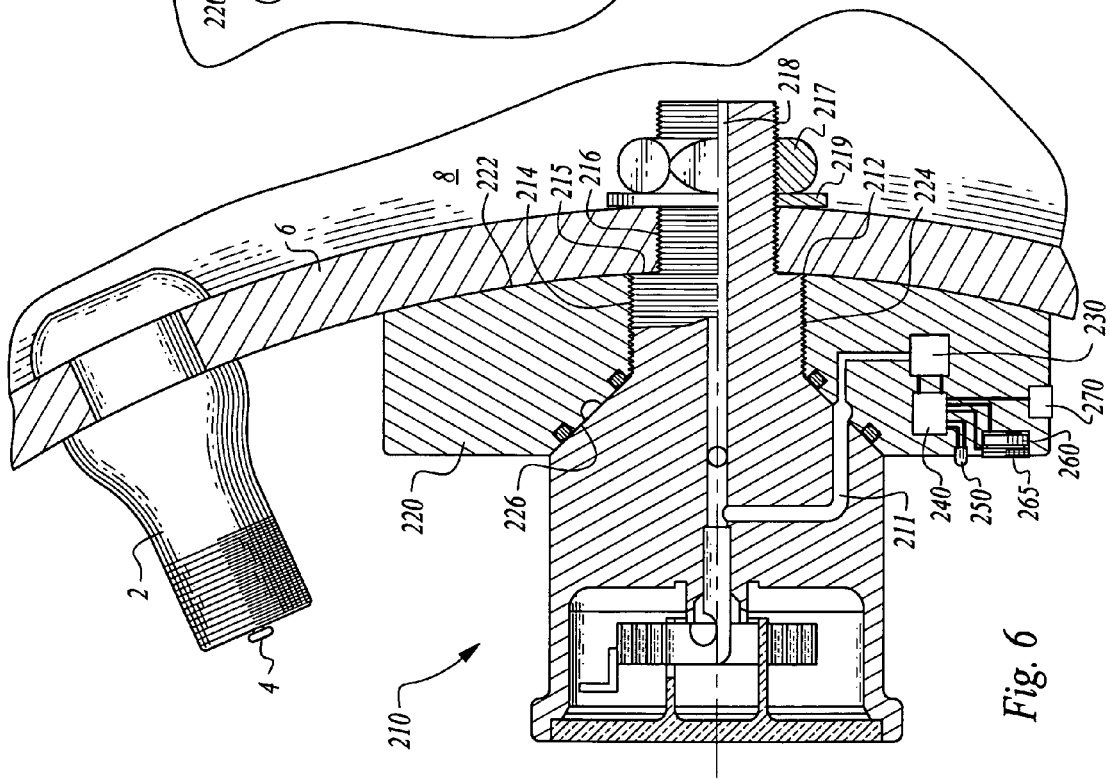
FIG. 6 is a full sectional view of an alternative embodiment of that which is shown in FIG. 1 where the gauge is mounted directly to a rim of a wheel/tire combination separate from a valve stem of the wheel/tire combination.

More specifically, and with particular reference to FIGS. 1 and 6, details of the valve stem 2 or other port associated with the tire or other compressed fluid reservoir, are described. While the gauge 10 of this invention could be utilized on a variety of different compressed fluid reservoirs, most typically it is anticipated that the gauge 10 would be utilized on vehicle tire/wheel combinations (generally also referred to herein merely as "tires"). Vehicle tires typically include a valve stem 2 which is an elongate cylindrical structure extending from a portion of the tire or a rim 6 of a wheel upon which the tire is mounted, or from an inner tube located within the tire.

This valve stem 2 acts as a port accessing an interior of the space in which the compressed air or other compressed gas or other fluid is located. A pin 4 is typically associated with the valve stem 2. This pin 4 is coupled to a valve within the valve stem 2. In particular, when the pin 4 is depressed, the valve is opened and fluids within the tire are able to escape. When the gauge 10 of this invention is placed upon the valve stem 2, the pin 4 is depressed and air or other fluids within the tire are allowed to pass into the gauge 10 and in particular to communicate with the Bourdon tube 50, so that the Bourdon tube 50 can properly measure the pressure of the fluid within the tire.

With continuing reference to FIG. 1, specific details of the housing 12 of the gauge 10 and fluid input and output structures of the gauge 10 are described according to a preferred embodiment. The entire gauge 10 is formed within a housing 12 which is preferably a unitary mass of material into which the various different parts of the gauge 10 are formed. This mass of material is typically a sufficiently high density and high strength plastic to resist the pressure differentials between an exterior of the housing 12 and interior pathways for the compressed fluid within the gauge 10. By making the housing 12 of a lightweight polymeric hydrocarbon plastic, a weight of the gauge 10 is minimized, such that balance of the tire is not adversely affected (or easily compensated) when the gauge 10 is on the valve stem 2.

The housing 12 is most preferably injection molded to include many of the structural features of the housing 12. other portions of the housing 12 can then be machined in additional processes or all of the various pathways within the housing 12 can be formed as part of the injection molding process, provided the mold has sufficient complexity and geometric features to provide all of the necessary pathways and contours. Furthermore, subassemblies such as the valve core 30 and the Bourdon tube 50 and lens 70 can be subsequently mounted to the housing 12 to complete the gauge 10.

The receiver 20 is formed on a portion of the housing 12 and acts as an inlet port sized and shaped so that it can mount securely over the valve stem 2 (by movement along arrow A of FIG. 1) on which the gauge 10 is intended to be utilized. This receiver 20 is essentially a blind bore having a cylindrical wall 22 extending into the housing 12. This cylindrical wall 22 can be threaded with threads that are designed to be complemental with threads on the valve stem 2. Alternatively, the cylindrical wall 22 can be formed of a resilient liner such as a soft rubber or other material which can maintain a pressure tight seal without requiring threads.

An O-ring 24 or fiber washer or similar gasket is oriented within an interior of the receiver 20 and surrounding a nose 26 which extends along a centerline of the receiver 20 and toward an opening of the receiver 20 somewhat. This nose 26 is particularly adapted to depress the pin 4 of the valve stem 2 so that the valve stem 2 has its valve open when the valve stem 2 has been inserted entirely into the receiver 20. A port also passes through the nose 26 so that air or other fluids from the valve stem 2 can pass into the gauge 10 through the receiver 20. A collar 28 surrounds the receiver 20 inlet and provides a location for mounting of the transmission module 90, as described in detail below.

The valve core 30 is spaced from the receiver 20 but has an interior thereof in communication with the receiver 20. The valve core 30 is optionally a structure separate from the housing 12 which can be press fit, bonded or otherwise attached to the housing 12 during manufacture. Preferably, at least portions of the valve core 30 are formed with the housing 12. The valve core 30 generally has a structure similar to that of the valve stem 2, except that it is coupled to the gauge 10 permanently. Furthermore, the valve core 30 can alternatively be configured so that a valve thereof opens merely when a source of high pressure fluid is coupled thereto, or can be configured to require a form of pin to depress a valve 35 within the valve core 30 before the valve core 30 is opened.

According to the preferred embodiment, the valve core 30 is generally configured as a cylindrical post 32 extending from the housing 12. This cylindrical post 32 is hollow with an interior thereof defined by a throat 34 near a tip of the cylindrical post 32 and a wider chamber below the throat 34. The valve 35 resides within this chamber primarily. The valve 35 includes a head 36 which extends up through the throat 34 and has a width similar to that of the throat 34. The valve 35 also includes a flange 37 below the head 36 which is sufficiently large that it cannot pass through the throat 34. The flange 37 thus keeps the valve 35 within the chamber. A tail 38 of the valve 35 extends further down into the chamber opposite the head 36.

A spring 39 is also located within the chamber and on a side of the flange 37 opposite the head 36 and throat 34. The spring 39 thus biases the valve 35 towards a position where the head 36 is within the throat 34 with the valve 35 closed. A seal is preferably provided between the flange 37 and the throat 34 to preclude leakage around the head 36 within the throat 34. When the head 36 is depressed and the spring 39 compressed, air (or other fluids) can pass through the throat 34 and around the head 36 which has been depressed down into the chamber below the throat 34. Such depression of the head 36 can occur either by action of some mechanical structure pressing on the head 36 or can merely occur when sufficient pressure is encountered to cause the spring 39 to be compressed and the valve 36 to move. This form for the valve core 30 shown in FIG. 1 could be modified to be in the form of other fluid inlet parts with values thereon, such as a standard Schraeder valve core.

Within the housing 12, preferably a junction 40 is provided which specifically provides for convenient communication between the receiver 20, the valve core 30 and the Bourdon tube 50. This junction 40 preferably includes three paths including a tire path 42 leading to the receiver 20, a fill path 44 leading to the valve core 30, a sensor path 46 leading to the Bourdon tube 50 and an output path 48 leading to the pressure transducer 100 of the transmission module 90. Should the invention be provided in a simplified form where no valve core 30 is provided, the junction 40 would be simplified to eliminate the fill path 44.

Figure 2:
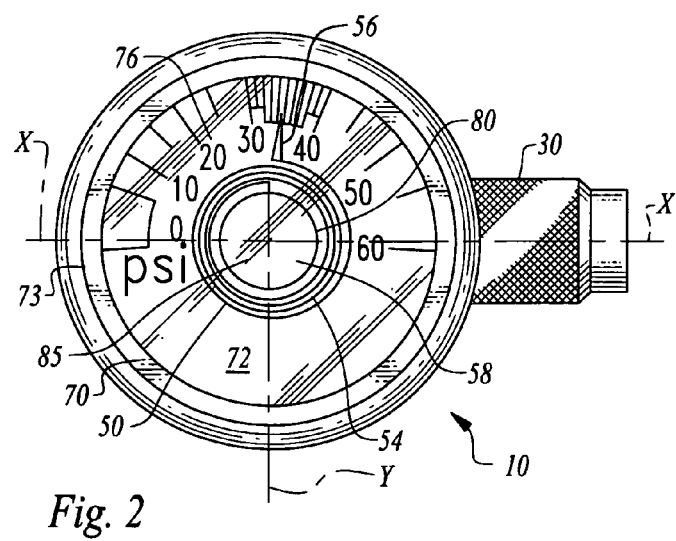
FIG. 2 is a front elevation view of that which is shown in FIG. 1.

With particular reference to FIGS. 1 and 2, details of the Bourdon tube 50 and sensor chamber 60 are described according to a preferred embodiment. The Bourdon tube 50 provides a preferred form of pressure sensor for this invention. As Bourdon tubes 50 are well known in the art, the description of the Bourdon tube 50 of this invention is limited to important details thereof which are impacted by the configuration of this invention.

The Bourdon tube 50 includes a post 52 extending axially from the sensor path 46 adjacent the junction 40 within the housing 12 of the gauge 10. The post 52 extends out into the sensor chamber 60 in which a remainder of the Bourdon tube 50 is located. At a tip of the post 52, the Bourdon tube 50 is bent into a plane perpendicular to the post 52. The Bourdon tube 50 then curves and extends radially a short distance before curving as a coil 54 on a helical path with a plurality of turns, typically four or more, until the Bourdon tube 50 terminates at sensor tip 56.

Typically, an arrow or other pointer is coupled to the Bourdon tube 50 at the sensor tip 56. A central opening 58 defines a space around the post 52 and surrounded by an innermost turn of the coil 54 of the Bourdon tube 50. Most preferably, the central opening 58 has a diameter similar to half or more of an overall diameter of the Bourdon tube 50 defined by an outermost turn of the Bourdon tube 50. The only portion of the Bourdon tube 50 within the central opening 58 is the post 52 and that portion of the Bourdon tube 50 extending from the post 52 to a first turn of the coil 54.

The sensor chamber 60 is generally cylindrical in form and larger than the Bourdon tube 50 to keep the Bourdon tube 50 from touching walls of the sensor chamber 60, most preferably. The sensor chamber 60 is bounded by a floor 62 which is preferably substantially planar and perpendicular to a direction in which the entire gauge 10 faces when being read by a user. A side wall 64 is preferably cylindrical and extends generally perpendicularly from a perimeter of the floor 62. This side wall 64 extends out to a rim 66 which is circular in form and defines the portion of the sensor chamber 60 most distant from the floor 62. The rim 66 preferably includes a step 68 therein where the rim 66 jogs slightly outwardly so that the side wall 64 has a slightly greater diameter beyond the step 68 than it has at the rim 66 and on a side of the step 68 closer to the floor 62.

Figure 3:
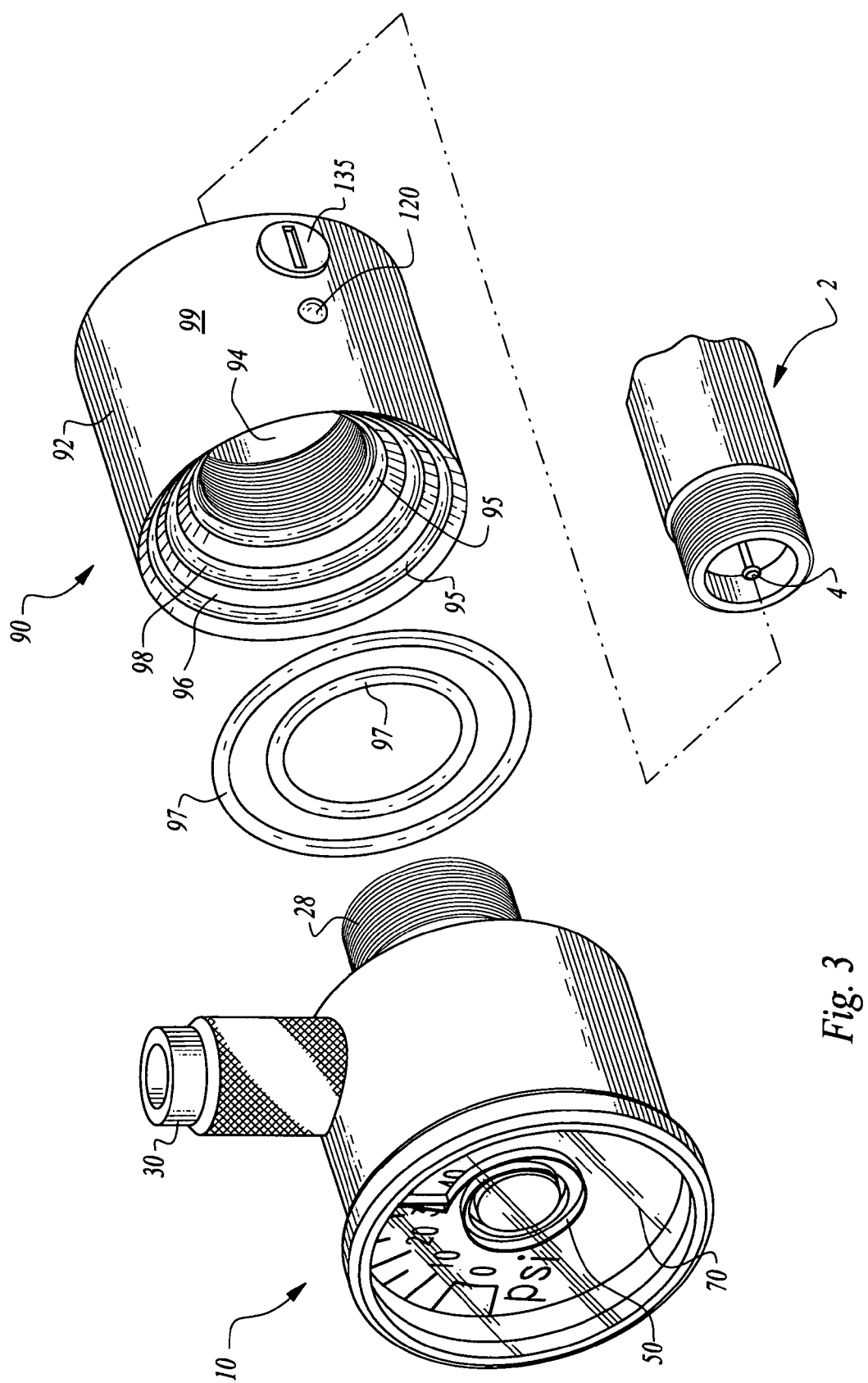
FIG. 3 is a perspective view of that which is shown in FIG. 1 with various subassemblies thereof exploded away from each other to illustrate their interconnection together.

With particular reference to FIGS. 1-3, details of the lens 70 and associated shroud 80 are described according to a preferred embodiment. The lens 70 is preferably provided to enclose (and typically seal) the sensor chamber 60 and to protect the Bourdon tube 50. The lens 70 is preferably formed of a transparent material or an at least partially transparent material, so that portions of the Bourdon tube 50, and particularly the sensor tip 56, can be seen through the lens 70. For instance, the lens 70 can be formed from a translucent plastic material. The lens 70 has a face 72 defining a side thereof which is viewed by a user. A peripheral edge 73 is preferably circular in form and bounds a perimeter of the face 72. This peripheral edge 73 has a diameter which allows it to rest upon the step 68 so that the lens 70 can be securely mounted to the sensor chamber 60. A rear surface 74 is provided opposite the face 72.

Indicia 76 can be printed upon the lens 70 for alignment with the sensor tip 56 of the Bourdon tube 50 so that correct pressure readings can be made. The indicia 76 can include both graduation lines extending radially from a center of the lens 70 and numbers indicative of pressures that exist when the sensor tip 56 of the Bourdon tube 50 is adjacent the graduation next to the pressure reading number. For instance, the number "40" might be placed next to the graduation which would indicate a pressure of 40 psi should the sensor tip 56 of the Bourdon tip 50 be pointed at this graduation adjacent the number "40" and should the pressure in fact be forty pounds per square inch (psi).

Both Metric and English units can be provided together on the gauge 10 if desired, or only one set of units can be provided if desired. The indicia 76 are calibrated along with the Bourdon tube 50 so that accurate pressure readings are made utilizing the gauge 10.

The indicia 76 are most preferably formed on the rear surface 74 of the lens 70 so that the indicia 76 cannot be inadvertently scratched off of the lens 70. As an alternative, the indicia 76 could be placed upon a card located adjacent the floor 62 of the sensor chamber 60, so that the indicia 76 are located behind the sensor tip 56 of the Bourdon tube 50. While the lens 70 is shown with a flat face 72, the face 72 could have a curving form following various different curves or could be faceted and still function adequately according to this invention.

Most preferably, a shroud 80 (FIG. 3) extends axially from the rear surface 74 and toward the floor 62 of the sensor chamber 60. This shroud 80 is preferably cylindrical in form with a diameter similar to a diameter of the central opening 58 of the Bourdon tube 50. The shroud 80 includes a root 82 adjacent the rear surface 74 and a tip 84 opposite the root 82. The shroud 80 is preferably shaped as a cylindrical wall between the root 82 and tip 84. The shroud 80 preferably includes a substantially hollow interior 85. Also, a slit 86 is formed in at least a portion of the shroud 80 extending from the tip 84 at least partially toward the root 82 at one point along the shroud 80. This shroud 80 can thus extend into the central opening 58 of the Bourdon tube 50 with an innermost turn of the coil 54 of the Bourdon tube 50 adjacent an outer surface of the shroud 80. The slit 86 allows a portion of the Bourdon tube 50 to extend from the post 52 through the slit 86 and out of the interior 85 of the shroud 80, so that the coil 84 of the Bourdon tube 50 is outside of the shroud 80, but adjacent the shroud 80.

The shroud 80 is a preferred form of a support wall or other structure to support the Bourdon tube 50, especially when centrifugal forces of the tire place lateral loads on the Bourdon tube 50. Other structures than the shroud 80 could be utilized to support the Bourdon tube 50 within the central opening 58 of the Bourdon tube 50, either extending from the lens 70, from the floor 62 or some other support. When the Bourdon tube 50 encounters these forces and tends to be bent away from a central axis of the Bourdon tube 50, the coil 54 impacts portions of the shroud 80 and substantially stops bending. These forces against the shroud 80 are absorbed by the entire housing 12 of the gauge 10 and by the receiver 20 mounted upon the valve stem 2. Thus, the Bourdon tube 50 cannot bend significantly and an elastic limit of materials forming the Bourdon tube 50 is not exceeded and de-calibration of the gauge 10 is prevented. Thus, when the tire ceases rotation or other forces come to an end (i.e. encountering bumps in the road or various vibration forces), the Bourdon tube 50 has not encountered any damage and continues to maintain a reading of accurate pressure for the tire.

In addition, a somewhat peculiar phenomenon is believed to occur, for at least some gauge 10 and valve stem 2 coupling orientations, that makes the shroud 80 particularly beneficial. The rotating tire and valve stem 2 can impart a somewhat centrifugal force on the Bourdon tube 50. Because the Bourdon tube 50 is of light thin walled material, this centrifugal force causes the Bourdon tube 50 to either tend to coil "tighter" into a lesser diameter spiral or to uncoil "looser" into a greater diameter spiral. Without the shroud 80, either change under load can take the Bourdon tube 50 past its elastic limit (or induce creep), causing the Bourdon tube 50 to be de-calibrated or destroyed altogether. Most preferably, the Bourdon tube 50 is selected to spiral in a direction that makes it coil "tighter" when mounted to the tire and the shroud 80 is provided as shown in FIGS. 1-3. The Bourdon tube 50 thus spirals tightly against the shroud 80, and the shroud 80 supports the Bourdon tube 50, preventing further damage. Note that gauges 10 on opposite sides of a vehicle would need Bourdon tubes 50 spiraling in opposite directions to provide proper performance along with the shroud 80. The gauges 10 could be marked "left" or "right" to simplify proper installation.

Figure 4:
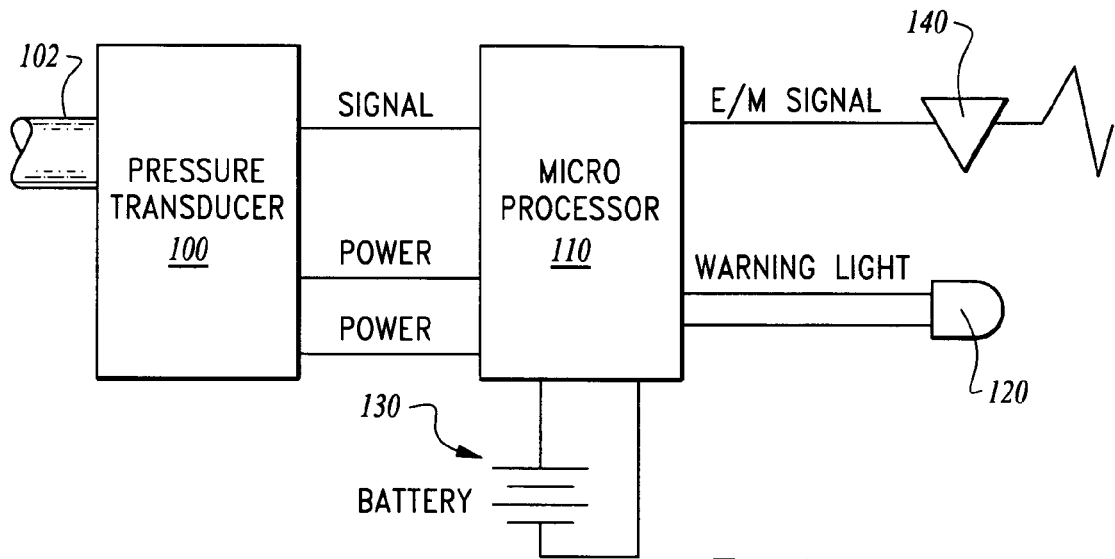
FIG. 4 is a schematic of electronics equipment which converts air within an input path into a pressure signal for transmission to a remote location.

With continuing reference to FIGS. 1, 3 and 4, details of the transmission module 90 are described, according to a preferred embodiment. The transmission module 90 provides a preferred form of secondary housing containing the pressure transducer 100, first processor 110, warning light 120, battery 130 and transmitter 140. This transmission module 90 is preferably formed separately from the gauge 10 so that the gauge 10 can be used with or without the transmission module 90.

To facilitate such gauge 10 solo operation, the output path 48 extending away from the junction 40 and toward the transmission module 90 preferably includes a valve thereon which is closed except when the transmission module 90 is coupled to the gauge 10. In this way, air is prevented from leaking out of the gauge 10 when the transmission module 90 is not coupled to the gauge 10. Such a valve could in many ways be similar to the valve core 30 (except typically smaller) and have a stopper spring loaded into a closed position except when the transmission module 90 abuts the stopper and pushes the stopper so that it moves to an open position and compresses a spring. Alternatively, the transmission module 90 could merely be formed within a common housing with the gauge 10.

The transmission module 90 could have a variety of different geometric configurations, attached to the gauge 10 in a variety of different ways and at a variety of different relative positions vis-a-vis the gauge 10 and the valve stem 2. Most preferably, however, the transmission module 90 is particularly shaped so that it can be coupled to the gauge 10 surrounding the valve stem 2 with the transmission module 90 directly adjacent the rim 6 (FIG. 6) to which the valve stem 2 would typically be attached.

The transmission module 90 is preferably contained within a ring housing 92 which is generally radially symmetrical about a central axis Z aligned with the valve stem 2. A central bore 94 passes along this central axis Z and is sized with a sufficiently large diameter so that the valve stem 2 can pass through the central bore 94. A tapered mouth 96 is provided on the central bore 94 on a side thereof adjacent the gauge 10. The gauge 10 is provided with a conical neck 14 on the housing 12 surrounding the receiver 20. This conical neck 14 preferably has a slope which matches that of the tapered mouth 96 so that the tapered mouth 96 can abut the conical neck 14.

An annular slot 98 is formed in the tapered mouth 96. This annular slot 98 is spaced radially from the central axis Z of the central bore 94 a distance similar to a distance that the output path 48 is spaced from this central axis Z. The annular slot 98 completely circumscribes the central axis Z upon the tapered mouth 96 so that the output path 48 terminates adjacent the annular slot 98 regardless of the rotational orientation of the ring housing 92 of the transmission module 90 relative to the gauge 10.

A pair of seals 97 reside within annular grooves 95 both above and below the annular slot 98 upon the central bore 94. These seals 97 prevent air leakage out of the gauge 10 and ring housing 92 when the transmission module 90 is coupled to the gauge 10. A cylindrical side 99 is provided on an outermost portion of the ring housing 92. This cylindrical side 99 can be gripped by a user and rotated, causing threads on the central bore 94 to cooperate with threads on the collar 28 extending radially from the housing 12 of the gauge 10 surrounding the receiver 20. The collar 28 thus acts as a support upon which the ring housing 92 of the transmission module 90 can be securely mounted.

As an alternative to the threads, other attachment mechanisms could be utilized to secure the ring housing 92 of the transmission module 90 to the housing 12 of the gauge 10. Also, it is conceivable that the ring housing 92 of the transmission module 90 would merely be securely sandwiched between the housing 12 and the rim 6 (FIG. 6) when the gauge 10 is mounted upon the valve stem 2.

The transmission module 90 preferably includes electronic circuitry therein to facilitate either only the powering of a warning light 120, the powering of an electromagnetic signal transmitter 140 with a signal correlating with tire pressure, or both. This circuit preferably has a general configuration similar to that provided in FIG. 4.

In particular, an input path 102 extends from the annular slot 98. This input path 102 leads to the pressure transducer 100. The pressure transducer 100 can be any appropriate pressure transducer which receives as input a pressure signal in the form of the input path 102 being in fluid communication with air from within the tire and some form of pressure sensor which generates an electric signal in some way correlating with the pressure sensed by the pressure transducer. While such a preferred configuration for the pressure transducer is disclosed, it is also conceivable that the pressure transducer could be configured to monitor a position of the Bourdon tube or other tire pressure sensor coupled to the proximal display. In such an arrangement, rather than providing the input path 102, some form of electric signal pathway (i.e. a signal wire) would extend between the housing 12 of the gauge 10 and the ring housing 92 of the transmission module 90.

The pressure transducer 100, to the extent it requires power, can either receive the power directly from the battery 130, its own dedicated battery, or from the battery through the first processor 110 as shown in FIG. 4. This first processor 110 also preferably has a path for a signal correlating with the pressure sensed by the pressure transducer 100, so that the microprocessor 110 receives information relating to tire pressure in the form of a pressure signal. This pressure signal (or a new signal related to the pressure signal) can then be passed on to the transmitter 140 for wireless transmission to the remote location, such as upon the vehicle to which the tire/wheel combination is mounted.

The circuit also preferably additionally includes a warning light 120 powered by the battery 130, either directly or through the microprocessor 110. The warning light 120 is preferably configured to be illuminated when electric current is passed therethrough. Thus, the warning light 120 could be in the form of a light emitting diode (i.e. an "LED"), an incandescent light bulb, or some other light emitting device powered by electric current.

The microprocessor 110 is preferably programmed with an acceptable pressure limit. When pressures outside of this acceptable pressure range are encountered, the warning light 120 is caused to be illuminated. As an alternative, this range can be made to be adjustable, either in a fashion which allows a manufacturer to set the transmission module 90 in a factory setting, or in a fashion which allows an operator to adjust the pressure range which triggers the warning light, so that the operator has control over when the warning light is caused to be illuminated.

Figure 5:
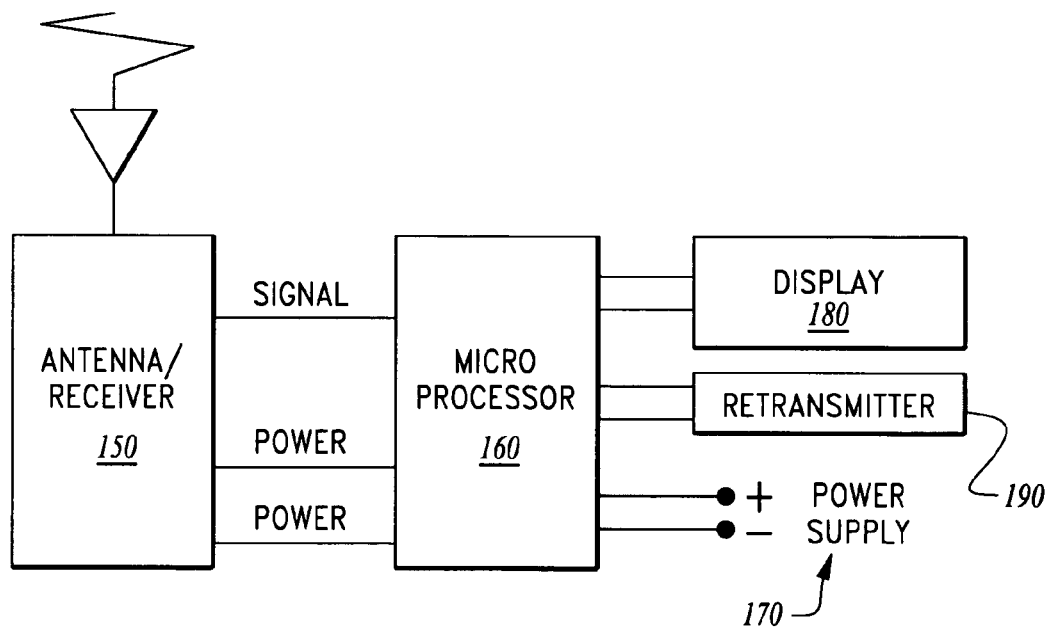
FIG. 5 is a schematic diagram of a receiver and display for use in conjunction with the electronic circuit of FIG. 4 with the circuit and components included in FIG. 5 located at a remote location spaced from the tire/wheel combination.

At the remote location a second circuit is provided shown in detail in FIG. 5. This second circuit includes an antenna/receiver 150 which receives the electromagnetic signal provided by the transmitter 140. The antenna/receiver 150 communicates this signal to a second processor 160 preferably located at the remote location. This second processor 160 also can provide power for the antenna/receiver 150 to the extent such power is required. The microprocessor 160 can receive power from a power supply such as a twelve volt battery on a vehicle. Other power supplies 170 could also be utilized including standard AC stationary power if the remote location is a stationary location off of the vehicle to which the tire/wheel combination is mounted.

Preferably, a display 180 is coupled to the microprocessor 160 and driven by the microprocessor 160. The display 180 at a minimum includes a light similar to the warning light which is illuminated when at least one tire/wheel combination has an improper pressure condition. In more complex systems, the display 180 can include a graphic representation of each of the wheels of the vehicle or numerical indicia representing the wheels of the vehicle, or words/letters representing wheels of the vehicle, and with either a warning light for each wheel or precise pressure information for each wheel. Any appropriate graphical user interface could be utilized for the display 180 in more complex versions of the invention.

A retransmitter 190 is also preferably provided at the remote location. This retransmitter could be in the form of a cellular telephone transmitting, such as through text messaging means or through an email interface with the internet, information relating to the status of the pressure within tires on the vehicle. For instance, a fleet operator could utilize information provided by the retransmitter 190 to monitor the wheels of vehicles within the operator's fleet of vehicles. As another alternative, the retransmitter could be utilized by a vehicle operator when the vehicle operator is at a truck stop and eating a meal away from the vehicle, either through a cell phone interface or a laptop interface, or some other wireless device interface appropriately communicating with the retransmitter 190.

Figure 7:
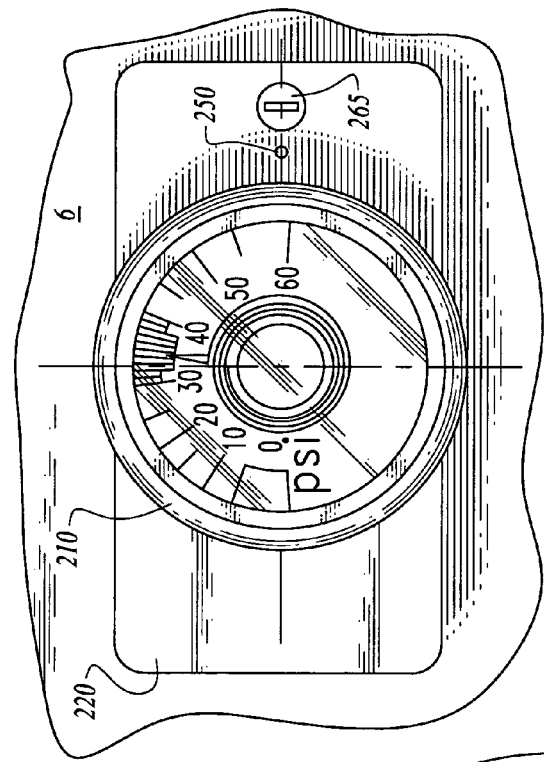
FIG. 7 is a front elevation view of that which is shown in FIG. 6.

With particular reference to FIGS. 6 and 7, details of an alternative "in rim" gauge 210 and associated alternative transmission module 220 are described. The gauge 210 and transmission module 220 are particularly configured for mounting directly to a rim 6 of a wheel/tire assembly, rather than upon the valve stem 2. With such an arrangement, the valve stem 2 remains available for addition (or removal) of air from the tire interior 8. Details of the in rim gauge 210 are similar to those of the gauge 10 of the preferred embodiment (FIG. 1) except where particularly described.

In particular, the in rim gauge 210 can include an elongate collar 212 which allows the collar 212 to extend through a hole in the rim 6 and into the interior 8 of the wheel/tire combination. Most preferably however, a tip of the elongate collar 212 is replaced with a short Schraeder-type valve stem oriented to only be open when the gauge 210 is on the valve stem. In this way theft or breakage of the gauge 210 does not allow air leakage from the tire. Other check valves could also be utilized.

The elongate collar 212 preferably includes a first stage 214 which is of greater diameter and includes threads for coupling to the alternative transmission module 220. A second stage 216 is spaced from the first edge 214 by a step 215. The second stage 216 has threads which are configured to interface with a nut 217. The nut 217 is threaded onto the second stage 216 of the elongate collar 212 with a gasket 219 oriented between the nut 217 and the rim 6. This gasket 219 is preferably a semi-crushable gasket 219 which forms a tight seal around the hole in the rim 6 when the gasket 219 is compressed by tightening of the nut 217.

An elongate tire path 218 provides fluid communication for air from the tire interior 8 into the in rim gauge 210. An outlet path 211 allows air to pass from the in rim gauge 210 to the alternative transmission module 220.

The alternative transmission module 220 is similar to the transmission module 90 except that its shape is somewhat different, preferably lower profile and includes a curving surface 222 for abutment against the rim 6. A central bore 224 can have the elongate collar 212 passing therethrough and a tapered mouth 226 on the central bore 224 is provided to abut against the in rim gauge 210 with the output path 211 passing into the alternative transmission module 220 through this tapered mouth 226.

Within the alternative transmission module 220 a pressure transducer 230 is provided along with a processor 240, warning light 250, battery 260 (included by an appropriate battery cover 265) and a transmitter 270. These elements are preferably similar to those described above with respect to the transmission module 90.

With particular reference to FIGS. 8-12, various alternative geometric configurations for the gauge 10 and transmission module 90 are provided according to various alternative embodiments. In particular, each of these embodiments includes a valve core, but the valve core is provided at various different orientations relative to the tire pressure sensor and proximal display in the for of the Bourdon tube within the center chamber, viewable through the lens.

FIG. 8 shows an arrangement where the lens is in a plane parallel with a center line of the receiver. In FIG. 8 a gauge 280 is shown with the valve core axially aligned with the receiver.

In FIG. 9, a gauge 290 is shown with the valve core skewed at approximately 45° away from axial relative to the receiver. In FIG. 10, a gauge 300 is shown with the valve core perpendicular to the receiver and aligned with a central axis of the lens.

Figure 11:
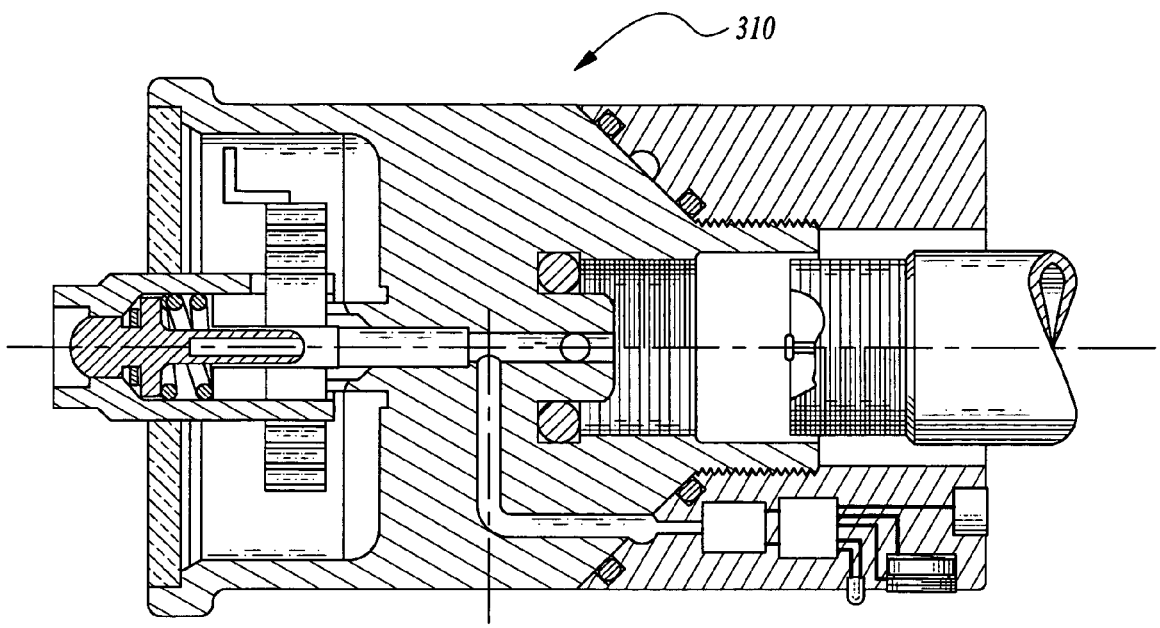
Figure 12:
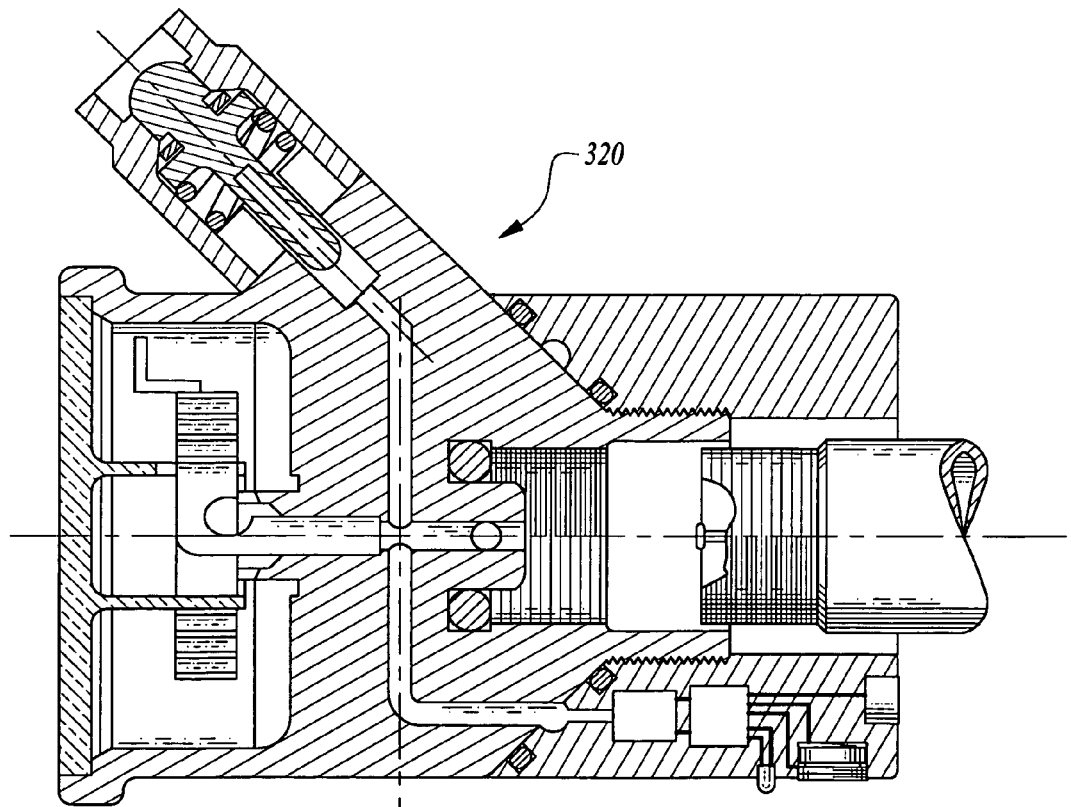

In FIG. 11 a gauge 310 is shown configured with the receiver axially aligned with a centerline of the lens and with the valve core passing through a center of the lens and also axially aligned with the receiver. In FIG. 12 an embodiment similar to FIG. 1 is provided except that a gauge 320 is shown with a valve core that is provided angled slightly toward the lens and provides a configuration where the lens can be viewed and the valve core easily accessed simultaneously.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. For instance, the indicia 76 and/or the sensor tip 56, or related portions of the sensor chamber 60 can be illuminated to enhance visibility in low light conditions. This illumination could be in the form of photoluminescent materials applied to the indicia 76 (or elsewhere), such as those which are charged by having light incident thereon and then emit light so that they "glow-in-the-dark" for visibility (such as in the evening), or can be coatings which are formed from a substance which is phosphorescent, chemiluminescent, or otherwise exhibits luminosity.

Alternatively, powered lights could be provided to view the sensor tip 56 and indicia of the proximal gauge. In such powered light configurations, some form of power supply (i.e. a battery) would be provided along with a simple electric circuit coupled to a light source. This light source could be an LED, a small incandescent light bulb, or some other form of powered light source. Typically with this powered light source embodiment, some form of switch would be provided to turn on the light when viewing is desired. This switch could be manually toggleable and mounted on the housing or could be a wireless switch (i.e. such as could be on a key chain as a key fob with a button thereon and a wireless transmitter transmitting to a receiver on the gauge 10). A user would depress the button when it is desired that the gauge 10 be read in low light conditions.

While the transmission module 90 is preferably configured only to transmit pressure data, a temperature sensor could be provided to sample temperature adjacent the tire/wheel combination and a temperature signal could also be transmitted to a remote location to inform an operator if an unsafe temperature condition exists. Also, the transmission module 90 can be encoded with a password or ID that is unique to each transmission module 90 or set of transmission modules 90 for a single vehicle. The receiver/antenna 150 and second processor 160 can be configured to only work with a particular password or ID. In this way, if the transmission module 90 is stolen it is precluded from working with other receiver/antenna 150 circuits. Theft deterrence is thus provided.

When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A tire pressure gauge featuring pressure data transmission, comprising in combination:
    a tire pressure sensor adapted to be in fluid communication with an interior of a tire;
    a proximal display coupled to said tire pressure sensor, said proximal display adapted to be viewed by an individual adjacent the tire;
    a pressure transducer, said pressure transducer adapted to create a pressure signal correlating with a pressure within the interior of the tire;
    a signal transmitter coupled to said pressure transducer, said signal transmitter adapted to transmit an electromagnetic signal relating to said pressure signal;
    a signal receiver spaced from said signal transmitter, said signal receiver adapted to receive said electromagnetic signal from said signal transmitter; and
    a remote display coupled to said signal receiver, said remote display adapted to interpret from said electromagnetic signal information relating to the pressure within the interior of the tire and generate a visually perceptible indicator relating to the pressure within the tire.

2. The gauge of claim 1 wherein said tire pressure sensor and said proximal display is driven entirely by the pressure within the tire.

3. The gauge of claim 2 wherein said tire pressure sensor and said proximal display includes a Bourdon tube in fluid communication with an interior of the tire.

4. The gauge of claim 1 wherein said proximal display is at least partially electrically powered.

5. The gauge of claim 4 wherein said pressure transducer is coupled to said tire pressure sensor, such that said tire pressure sensor provides tire pressure information both to said proximal display and to said signal transmitter through said pressure transducer.

6. The gauge of claim 1 wherein said tire pressure sensor, said proximal display, said pressure transducer and said signal transmitter are each supported within a common housing adapted to be coupled to a tire.

7. The gauge of claim 1 wherein said tire pressure sensor and said proximal display are both supported within a common housing adapted to be coupled to a tire, and wherein said pressure transducer and said signal transmitter are supported within a transmission module separate from said common housing with said transmission module adapted to be removably coupled to said common housing.

8. The gauge of claim 7 wherein said transmission module is of generally annular form with a central bore sized sufficiently large to allow a valve stem of a tire to pass through said central bore, said common housing adapted to be coupled to the valve stem with said transmission module interposed between said common housing and said tire.

9. The gauge of claim 8 wherein said common housing includes a collar extending axially from said common housing relative to an axis aligned with a central axis of the valve stem of the tire, said collar including threads on an outer surface thereof, said threads configured to be complemental with threads on said central bore of said transmission module.

10. The gauge of claim 9 wherein said transmission module includes a tapered mouth on a side of said central bore closest to said common housing, said tapered mouth including an annular slot therein aligned with an output path in fluid communication with an interior of the tire, such that air within said tire can pass into said common housing, through said output path and into said annular slot, said annular slot oriented circumferentially spaced from said central axis of said valve stem with a distance away from said central axis similar to a distance that said output path is spaced from said central axis, such that said output path is aligned with said annular slot regardless of a rotational orientation of said common housing relative to said transmission module.

11. The gauge of claim 7 wherein said common housing includes an elongate collar adapted to pass through a hole formed in a rim of a wheel having the tire mounted thereon, the elongate collar having a tip in fluid communication with an interior of the tire.

12. The gauge of claim 11 wherein said common housing is adapted to be mounted to the rim at a location spaced from a valve stem passing through the rim, such that access to the interior of the tire through the valve stem is not precluded by coupling of said common housing to the rim.

13. The gauge of claim 1 wherein said pressure signal created by said pressure transducer has at least two values including a pressure proper value and a pressure improper value.

14. The gauge of claim 13 wherein a warning light is coupled to said pressure transducer, said warning light adapted to be illuminated when said pressure transducer creates said pressure signal having said pressure improper value.

15. The gauge of claim 14 wherein said remote display includes an indicator which visually represents that pressure within the tire is improper when said pressure signal created by said pressure transducer has a pressure improper value.

16. The gauge of claim 1 wherein said pressure signal created by said pressure transducer includes pressure measurement data therein, said remote display adapted to interpret the electromagnetic signal into a pressure measurement for pressure within the tire, such that said remote display displays to a user adjacent the remote display what the pressure is within the tire.

17. The gauge of claim 1 wherein a valve core is interposed between said tire pressure sensor and a receiver adapted to provide fluid communication between said tire pressure sensor and an interior of the tire, such that said valve core can add or remove air from the tire when said gauge is mounted to the tire, without requiring removal of said gauge.

18. The gauge of claim 1 wherein said electromagnetic signal is at least partially an RFID signal at least partially powered by an electromagnetic signal delivered to the signal transmitter.

19. The gauge of claim 1 wherein said electromagnetic signal at least partially includes a radio frequency signal generated by a transmitter coupled to a power supply, said power supply also coupled to said pressure transducer with said power supply contained within a common housing with said transmitter and said pressure transducer.

20. A fill through tire pressure gauge comprising in combination:

a tire pressure sensor adapted to be in fluid communication with an interior of a tire;

a proximal display coupled to said tire pressure sensor, said proximal display adapted to be viewed by an individual adjacent the tire;

a valve core adapted to receive a source of pressurized air and adapted to direct the pressurized air into the tire when said tire pressure sensor is in fluid communication with the interior of the tire;

a pressure transducer, said pressure transducer adapted to create a pressure signal correlating with a pressure within the interior of the tire;

a warning light coupled to said pressure transducer, said warning light adapted to be illuminated when said pressure signal corresponds with a tire pressure below a selected minimum pressure;

wherein said pressure transducer is coupled to a signal transmitter, said signal transmitter adapted to transmit an electromagnetic signal related to said pressure signal;

a signal receiver spaced from said signal transmitter, said signal receiver adapted to receive said electromagnetic signal from said signal transmitter; and a remote display coupled to said signal receiver, said remote display adapted to interpret from said electromagnetic signal information relating to the pressure within the interior of the tire and generate a visually perceptible indicator relating to the pressure within the tire.

21. The gauge of claim 20 wherein said pressure transducer is coupled to said tire pressure sensor with said pressure transducer adapted to create said pressure signal corresponding with a pressure sensed by said tire pressure sensor.

22. The gauge of claim 20 wherein said pressure transducer is adapted to create said pressure signal separate from said tire pressure sensor, said tire pressure sensor including a Bourdon tube with said proximal display including an indicator coupled to said Bourdon tube.

23. The gauge of claim 20 wherein said remote display includes a second warning light with said second warning light becoming illuminated when said warning light coupled to said pressure transducer is illuminated.

24. The gauge of claim 20 wherein said tire pressure sensor is adapted to be mounted to a valve stem coupled to said tire.

25. The gauge of claim 20 wherein said tire pressure sensor is adapted to be mounted to a rim of a wheel upon which the tire is mounted at a location spaced from a valve stem in the rim.

* * * * *